UNITED STATES PATENT OFFICE.

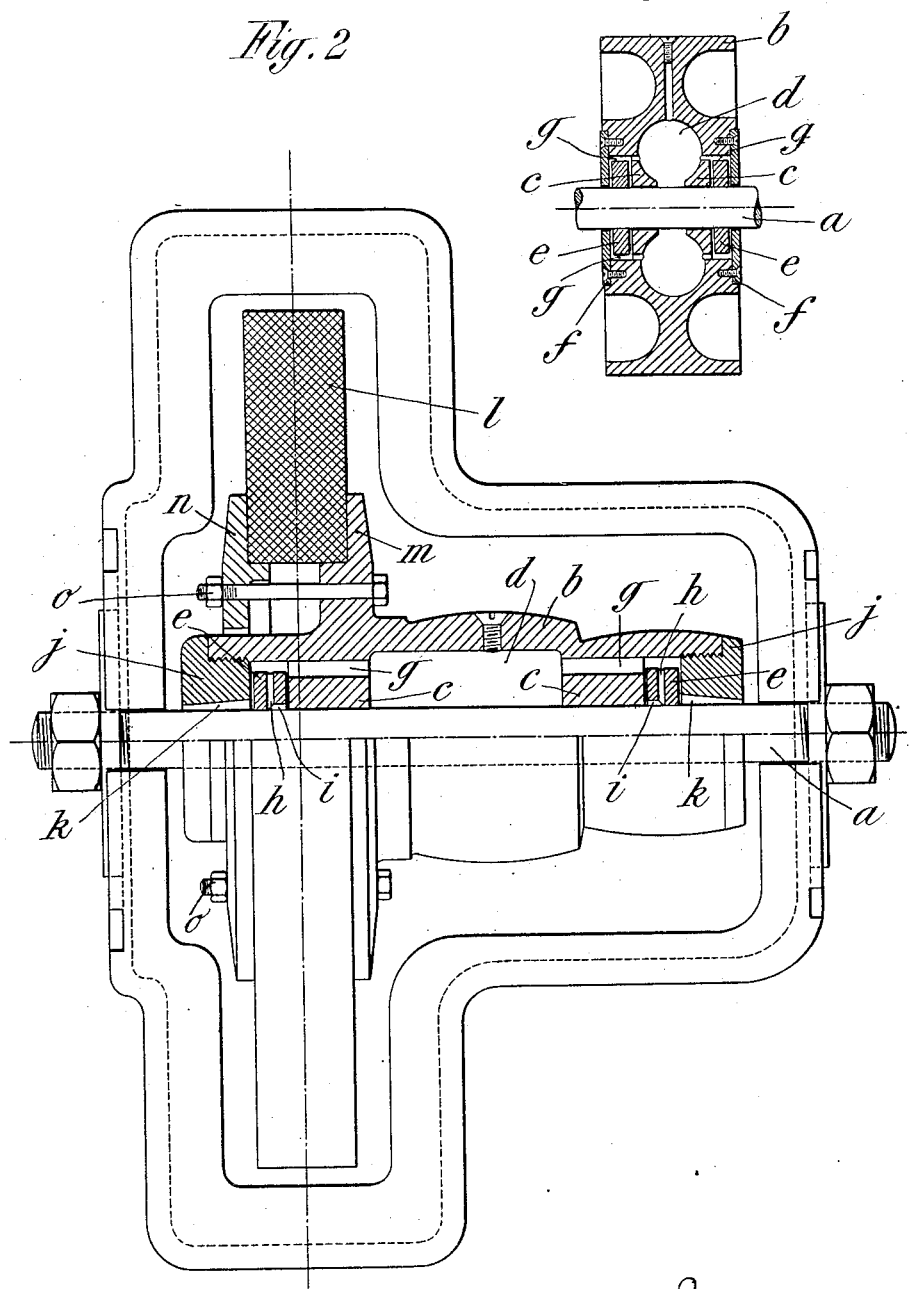

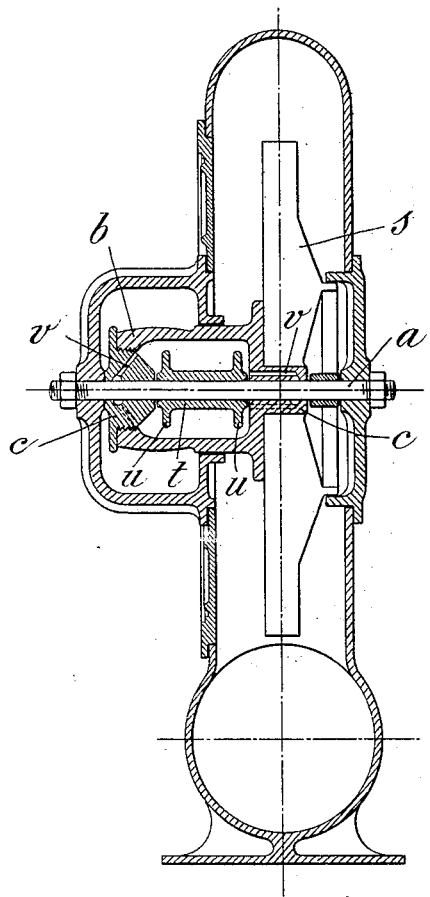

JEAN MARCEL AUBERT, OF BILLANCOURT, FRANCE.

BEARING FOR PULLEYS AND THE LIKE.

1,367,936. Specification of Letters Patent. Patented Feb. 8, 1921.

Application filed June 24, 1918. Serial No. 241,558.

*To all whom it may concern:*

Be it known that I, JEAN MARCEL AUBERT, citizen of the Republic of France, and resident of 3 Rue de la Ferme, Billancourt, Seine, in the said Republic, have invented certain new and useful Improvements in Bearings for Pulleys and the like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Ordinarily, in pulleys or transmission cones, as in various kinds of apparatus: fans, pumps, grindstones, circular saws, dynamos, etc., the shaft turns in two fixed bearings. The present invention consists essentially, on the contrary, in leaving the shaft stationary and in causing to rotate thereon the bearings which form one with the pulley and, if desirable with the apparatus the pulley is to actuate or by which it is placed in motion.

The advantages sought to be attained by this innovation and by the conditions under which it is realized are the following: great simplification of arrangement, but slight obstruction, strong construction, protection from dust, diminished wear and without oval wear, perfect centering, absence of faulty bearing, of torsion and of prejudicial vibrations, finally, perfect lubrication insured by the rotation of the system itself.

Various examples of the application of the invention are illustrated in the accompanying drawings.

Figure 1 shows its application to a simple pulley which is represented in section through the axis.

Fig. 2 is a half plan view and half horizontal section representing a pulley to which a grindstone is affixed in such a manner that the two form only a single part which is provided with bearings rotating on a stationary shaft in accordance with the present system.

Figs. 3 and 4 are detail views, in two vertical planes at right angles, of the method of fixing the shaft represented in Fig. 2.

Fig. 5 is a vertical section of a pulley carrying a fan and shows a modification of the method of construction.

In Fig. 1, $a$ is the stationary shaft, which may be supported in the manner indicated in Figs. 2, 3 and 4, or in any other suitable manner. The pulley which rotates on this shaft is composed of a body $b$ having the exterior form of ordinary pulleys, but the part of which adjacent to the axis forms two bearings $c$, $c$, between which an annular space $d$ is reserved serving as a lubricant reservoir. The lateral play of the bearings of the pulley is adjusted by means of two rings $e$, $e$, fixed on the shaft and which are confined between each of these bearings and the disk $f$ fixed to each face of the pulley. These rings serve as dust guards and at the same time to convey the oil into the pulley bearing by the effect of centrifugal force.

At rest, it will be understood, the oil is at the lower part of the central space of the pulley; as soon as the latter begins to rotate, the oil, under the effect of centrifugal action, takes the form of a ring covering the periphery of this space and passing by the holes $g$, provided in sufficient number, it comes in contact with the stationary rings $e$, $e$, and spreads itself over the shaft; under the action of gravity it falls, then is taken up again by centrifugal force, and, there is therefore established a peripheral oil level at the same time as an active circulation of such oil.

The arrangement illustrated in Fig. 2 does not differ from that which has just been described. The rings $e$, $e$, are, however, pierced with radial holes $h$, with which holes $i$ communicate, and plugs $j$ are pierced with a conical hole $k$ which forms an annular space around the shaft $a$ so that the centrifugal force conveys the oil back to the reservoir. On the other hand the bearings $c$, $c$, are more widely separated from each other, being situated near the two extremities of the block formed by the pulley and the hub of the grindstone $l$. The latter is set in the collar $m$ forming part of the pulley and is secured by a disk $n$ and fixing bolts $o$.

The method of mounting the shaft indicated in Figs. 2, 3 and 4, and which may be advantageously employed also for other apparatus, consists in placing the shaft in slots $p$ of the frame and to prevent it rising, providing it, at each end, with a cheek $q$ pierced with a hole to receive same and which is introduced under a flange $r$ on the frame; this cheek may be secured to the frame by safety bolts or by lock nuts.

Fig. 5 which shows, as an example, the application of the system to a fan $s$, illustrates a modification of the arrangement of bearings. It consists in replacing the stationary abutment rings $e$, $e$, situated outside the bearings by a dead central body $t$, also fixed to the shaft and presenting two circular projections $u$, $u$, which penetrate the ring of oil, thus attracting the lubricant, which spreads along the shaft to proceed again toward the periphery, by the holes $v$, under the action of centrifugal force.

One or other of the modifications of construction described will be employed according to the dimensions of the apparatus to which the system is to be applied.

What I claim as my invention, and desire to secure by Letters Patent, is:—

1. A bearing for pulleys and the like, comprising a stationary shaft, a pulley having axially arranged bearing portions rotatably mounted on the shaft, said bearing portions having an annular space forming a lubricant reservoir centrally communicating with the shaft, laterally arranged abutment rings adjustably mounted on the shaft on either side of said bearing portions, axially arranged passages extending from the annular space to the abutment rings, and means on the ends of the pulley closing the outer ends of the axially arranged passages, whereby the lubricant is conveyed by centrifugal action to said abutment rings and shaft.

2. A bearing for pulleys and the like comprising: a stationary shaft; a hollow pulley concentric with this shaft; said pulley having interior enlargements which rotate in contact with the stationary shaft; rings rigidly secured on the shaft and abutting laterally against the interior enlargements, the wall of the hollow part of the pulley having a hole serving to introduce lubricant thereto; said interior enlargements having conduits, one extremity of which opens into the lubricant chamber in the zone farthest removed from the axis; said abutments having conduits communicating on the one hand with the above named conduits, and on the other hand with the periphery of the shaft; plugs closing the extremities of the pulley; and a means of supporting the shaft in position.

3. A bearing for pulleys and the like comprising: a stationary shaft; a hollow pulley concentric with this shaft; an apparatus rigidly fixed to the said pulley, so that one of the elements carries along the other directly; said pulley having interior enlargements which rotate in contact with the stationary shaft and form an interior hollow portion; rings rigidly secured on the shaft and abutting laterally against the interior enlargements, the hollow part of the pulley having a hole serving to introduce lubricant thereto; said interior enlargements having conduits, one extremity of which opens into the lubricant chamber in the zone the farthest removed from the axis; other conduits pierced in the above named lateral abutments, and communicating on the one hand with the above named conduits, and on the other hand with the periphery of the shaft; plugs closing the extremities of the pulley; and a means of supporting the shaft in position.

In testimony that I claim the foregoing as my invention, I have signed my name in presence of two subscribing witnesses.

JEAN MARCEL AUBERT.

Witnesses:
CHAS. P. PRESSLY,
CHARLES ABBE.